Dec. 12, 1933.  W. C. LINDEMANN ET AL  1,939,069
FUEL CONTROL MECHANISM
Filed Oct. 15, 1929   2 Sheets-Sheet 1

Inventor
Walter C. Lindemann
Adolph J. Schmidt
By their Attorney
S. J. Cox.

Dec. 12, 1933. W. C. LINDEMANN ET AL 1,939,069
FUEL CONTROL MECHANISM
Filed Oct. 15, 1929 2 Sheets-Sheet 2
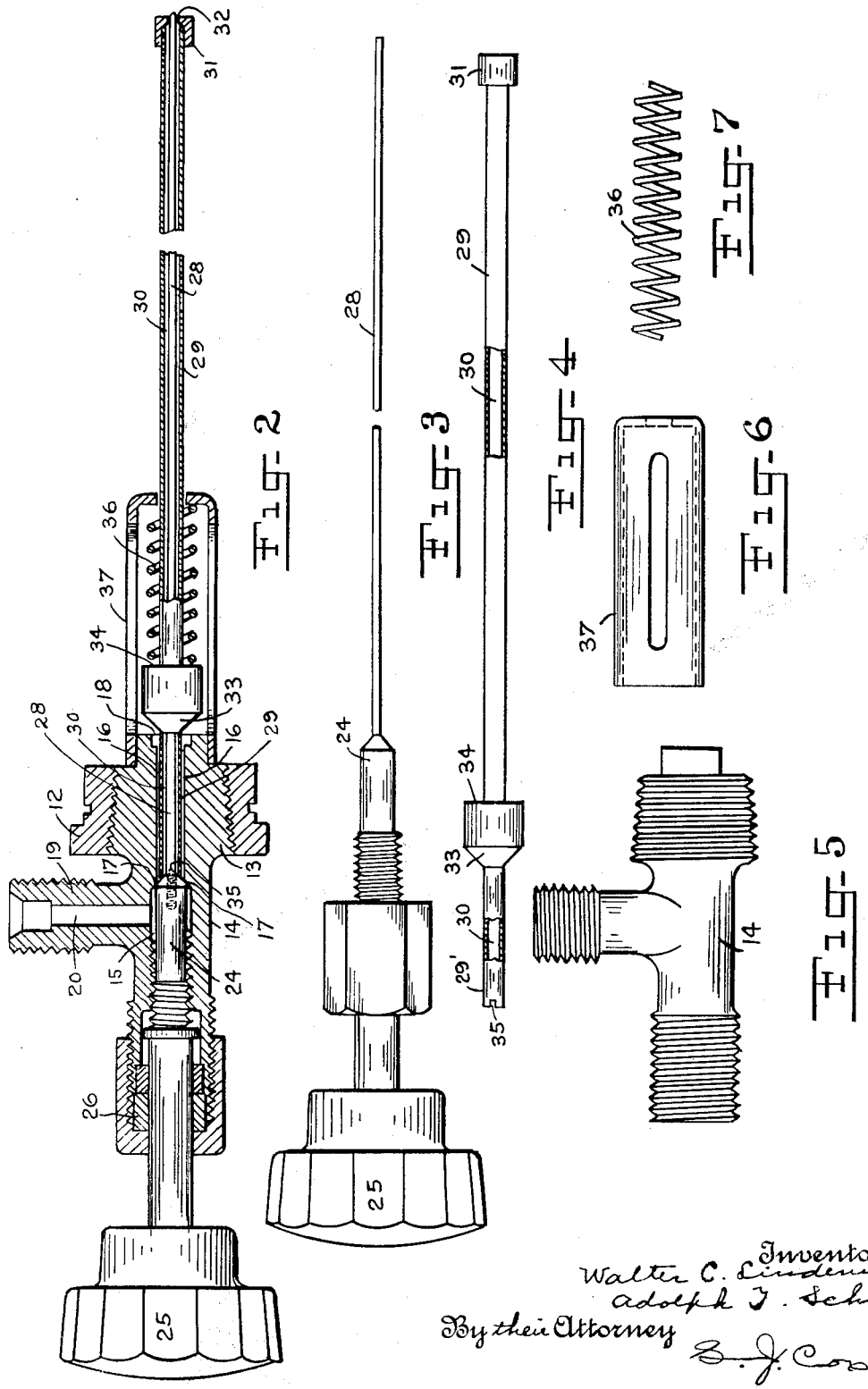
Inventor
Walter C. Lindemann
Adolph J. Schmidt
By their Attorney Patented Dec. 12, 1933

1,939,069

UNITED STATES PATENT OFFICE 1,939,069

FUEL CONTROL MECHANISM

Walter C. Lindemann and Adolph T. Schmidt, Milwaukee, Wis., assignors to A. J. Lindemann & Hoverson Company, Milwaukee, Wis., a corporation of Wisconsin Application October 15, 1929. Serial No. 399,723

27 Claims. (Cl. 158—81)

The present improvements relate, in general, to stoves, lamps, lanterns, and the like which are adapted to employ fluid hydrocarbon as fuel wherein the fuel is conducted to a generator and burner for heating or lighting purposes. More particularly, the improvements are directed to a novel combination of elements for combining fuel components and supplying same at the point of use and are in the nature of an improvement on our arrangement described and claimed in the copending application filed June 25, 1929, Serial No. 373,579.

A primary object, among others, is to provide a novel arrangement of parts for preparing fuel for a vapor burner which is suitable alike for initial lighting or continuous combustion purposes. A further object is to provide means for regulating and varying the character of the fuel supplied from a tank or reservoir and insuring the necessary fuel components under various conditions.

Another object is to provide a novel control mechanism associated with a fuel reservoir having liquid fuel under air pressure wherein a fuel mixture of varying content may be formed from the elements within the tank. A further object is to provide a device of the foregoing character wherein a rich or lean fuel mixture may be had at will, and one in which the air pressure for conveying the liquid fuel is not materially reduced by reason of employing a portion of same in preparing a fuel mixture.

A still further object of the improvements is to provide a device of the character indicated wherein the ingredients of the fuel are positively and individually regulated and controlled, wherein such regulation and control is simultaneously accomplished by a single actuating member, so that the proportions of the ingredients may be concurrently varied at will. Another object is to provide a positive means for sealing off the air pressure region of the reservoir after fuel has been withdrawn therefrom for initial lighting purposes thereby insuring maintenance of the pressure in the reservoir for continuous operation.

To simplify the operation and improve the efficiency of vapor burning devices, in general, constitutes a further object of the invention. Other objects and advantages of the improvements will be apparent upon reference to the accompanying specification and drawings in which Fig. 1 is a view partly in section and partly in elevation of a lantern, illustrating one application of the present improvements;

Fig. 2 is an enlarged sectional view of the fuel regulating mechanism;

Figs. 3 to 7 are details of the elements illustrated in Fig. 2, shown unassembled.

Figure 1:
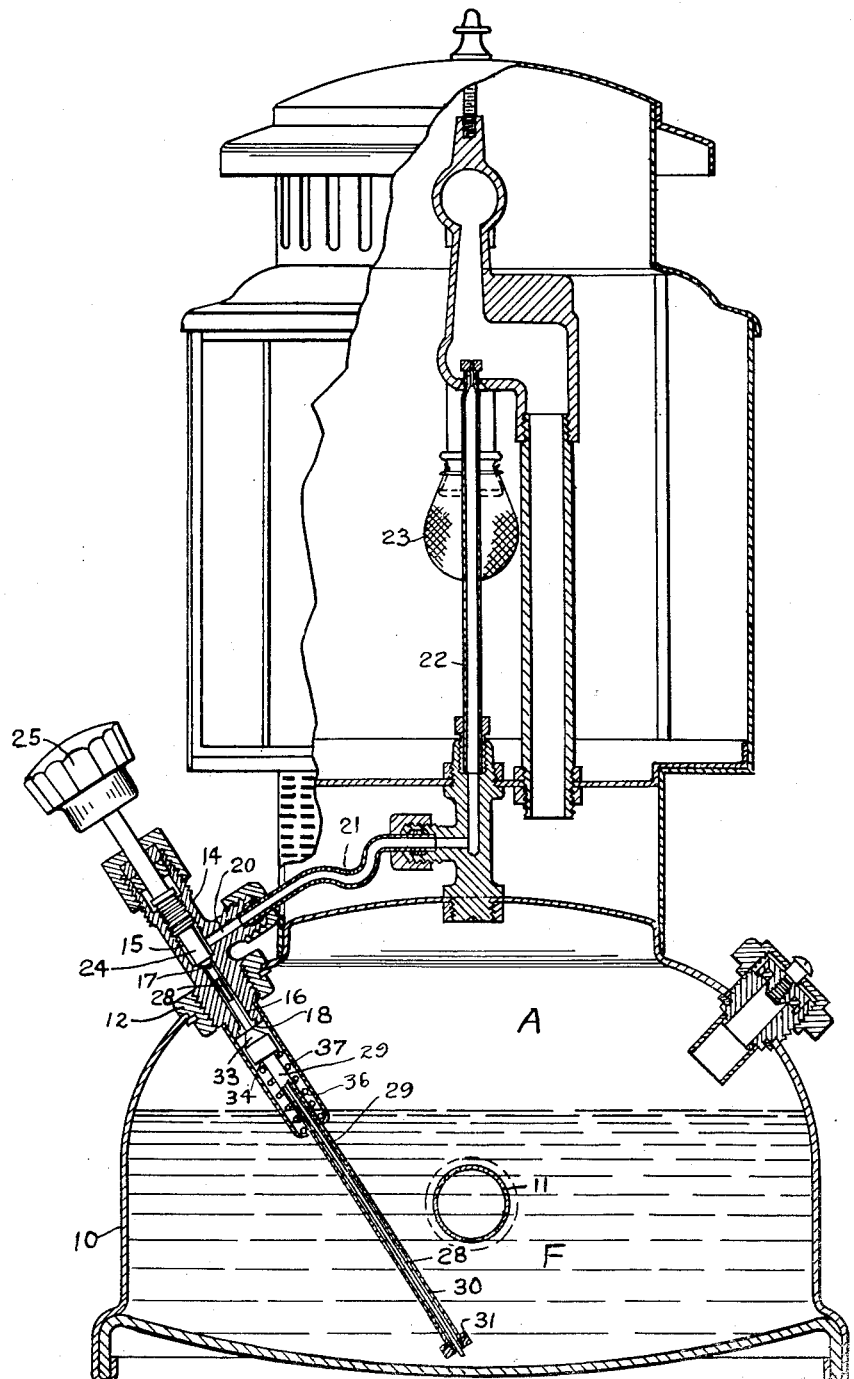

The present improvements are designed for use in vapor burning apparatus and include a reservoir or tank having liquid fuel under air pressure therein. Accordingly, there is an air space above the liquid level in the tank and the air therein may become impregnated with volatile hydrocarbon so that air as well as mixed fuel in a gaseous state obtains under pressure in the space above the liquid level. The improvements accordingly provide for the use of air or mixed fuel from the air space of the reservoir during the initial heating operation of the vapor generator whence same may be positively cut off to preserve the pressure in the reservoir while the generator and burner continue to be supplied with liquid fuel from the lower region of the reservoir.

Referring to the drawings, a lantern is illustrated in Fig. 1 having a tank or reservoir 10 provided with a pump 11 for injecting air pressure therein. The showing of the pump is merely illustrative since any suitable means may be employed for placing the liquid in the tank under air pressure. Furthermore, although the improvements have been chosen for illustration in connection with a lantern, it is understood that they are applicable to vapor burning devices, in general, such as stoves and the like, and are therefore not to be limited in their application. For convenience in description, the liquid space containing the liquid fuel partially filling the tank 10 has been designated F, while the air space immediately above, containing the air under pressure has been designated A. Accordingly, after the tank has been filled to the prescribed level, air pressure is injected into the tank for use as hereinafter described. In the accompanying description and claims, reference to "liquid space" and "air space" is understood to describe such portions of the reservoir containing the fuel components above set forth.

The wall of tank 10 is apertured and provided with a threaded collar 12 which receives the threaded bushing 13 of valve body 14. As illustrated the valve body 14 is axially bored to provide communicating channels 15 and 16 of slightly different cross section. Interposing these channels or ducts is a conical valve seat 17 and at the inner end of channel 16 is another valve seat 18. A neck 19 is provided on valve body 14 having a bore 20 establishing communication between channel 15 and pipe 21 which leads to vapor generator 22 and thence to the vapor burner 23.

A valve member 24 has threaded engagement with the outer end of the bore of valve body 14 and has an actuating knob or handle 25 extending through suitable packing means 26. Said valve member 24 is provided with a conical head for seating on seat 17, so that communication between channels 15 and 16 may be controlled by advancing or retracting the valve through knob 25. It will be noted that the inner end of channel 16 at valve seat 18 opens into the air pressure region of the tank 10 so that a conduit for the passage of gaseous fuel from air space A to the generator is provided by channels 16, 15, bore 20 and pipe 21.

As seen in Fig. 3, the valve 24 has a rod or stem 28 which extends from the valve into the liquid space as seen in Fig. 1, said rod partaking of all movements of the valve. A pipe or tube 29 surrounds the rod 28, the relation between the two being such as to provide an annular channel or duct 30 therebetween. As illustrated in Fig. 1, the rod and tube both extend a considerable distance into the body of liquid fuel in the tank so that the tip of the rod and the cap 31 of the tube terminate adjacent the bottom of the tank. It is notable that in the closed position of valve 24, the tip of rod 28 projects through cap 31, and that the passage 32 between the rod and the cap, which establishes communication between the liquid space F and channel 30, is restricted and of less cross sectional area than that of said channel.

The tube 29 is provided with a conical valve 33 and a shoulder 34 fixed thereto. A pair of notches 35 is provided in the end of the tube. As described, the tube 29 surrounds rod 28 and is held in the illustrated position with the notched end 29' thereof contacting the conical head of valve 24 by means of spring 36 and cage 37. The latter is fixed to the inner end of bushing 13 and surrounds the rod and tube while spring 36 engages the end of the cage and the shoulder 34 on tube 29. It is thus apparent that the tube 29 with valve 33 are resiliently maintained against valve 24 so as to partake in movements thereof. As illustrated, the valve 33 is aligned with valve seat 18, so that upon partial opening of valve 24, the valve 33 urged by spring 36, approaches said seat and upon continued opening of valve 24, the valve 33 closes on seat 18, thereby cutting off the air space of the tank from channel 16.

When the valve 24 is slightly withdrawn to open position, it is apparent that a liquid conduit is provided for establishing communication between the liquid space of the tank and the generator. This conduit comprises passage 32, channel 30, notches 35, channel 15, bore 20 and pipe 21. As described, the channel 16 communicates between the air space of the tank and channel 15 so that the liquid conduit above set forth has an inlet communicating with the air pressure region of the tank. Accordingly, the fuel supply conduit for the generator communicates with the tank both above and below the liquid level thereof.

In operation, the elements are in the position illustrated in Figs. 1 and 2 before the generator and burner are started. In this position, the valve 24 is closed so that neither air nor liquid may pass from the tank to the generator. However, the air valve 33 is open, being held from its seat 18 by valve 24 against the action of spring 36. Likewise the channel 30 in tube 29 is in communication with the liquid space through passage 32. As described however, the closed valve 24 cuts off communication between the generator and both the liquid and air spaces of the tank.

For initial lighting or preheating purposes the valve 24 is opened slightly whereby air from above the liquid level passes through the open channel 16 and at the same time liquid fuel feeds through passage 32, up through channel 30, and notches 35, so that a mixture of air and liquid fuel is supplied to the generator through channel 15, bore 20 and pipe 21. The quality of this mixture may be varied by further opening valve 24 whereby valve 33 responds to this movement under the influence of spring 36. Valve 33 accordingly approaches seat 18 and the amount of air passing through channel 16 is reduced so that the mixture delivered to the generator has a greater percentage of liquid fuel by reason of this adjustment.

Upon still further opening of valve 24, the percentage of air is decreased and the percentage of liquid fuel increased, until the retraction of valve 24 is sufficient to cause air valve 33 to close at seat 18, whereby the air space of the tank is completely sealed off from the fuel supply conduit to the generator and only liquid fuel is supplied thereto through passage 32, channel 30 and notches 35. After such positive sealing off of the air pressure region, the supply of liquid fuel may be further regulated by additional retraction of valve 24 which now moves away from the notched end of tube 29 and at the same time withdraws the tip of rod 28 back through passage 32, thereby enlarging said passage and permitting full free flow of liquid fuel therethrough to channel 30 and thence to the generator. Since the air pressure space of the tank is positively sealed off after initial lighting is accomplished, continuous operation of the generator and burner is assured since the air pressure is preserved for use in effecting discharge of the liquid fuel through the liquid conduit so long as there is liquid fuel in the tank.

After valve 24 and rod 28 have been completely retracted to permit full free flow of the liquid fuel, it is apparent that this liquid supply may be controlled and regulated by advancing these elements inwardly, thereby causing valve 24 to approach the end 29' of the tube 29 and causing the rod 28 to enter passage 32 whereby the quantity of liquid fuel passing to the generator is reduced.

It is apparent from the foregoing description that the present improvements provide a positive means for preparing and regulating mixed fuel under certain conditions and likewise regulating the liquid fuel supply under other conditions. Accordingly, by the actuation of the knob 25, the air inlet and the liquid inlet to the fuel supply conduit for the generator may be simultaneously regulated, simultaneously shut off, simultaneously opened, or one inlet closed while the other is open, and various other adjustments made. By this novel arrangement, a richer or leaner mixture may be obtained, and the type, quality and quantity of the fuel varied at the will of the operator by the actuation of a single operating means.

Attention is directed to the fact that the air duct 16 is disposed in such a relation to notches 35 of the liquid fuel duct 30, (in the illustrated embodiment the former surrounds the latter) that the passage of air through duct 16 to channel 15 may exert a suction action tending to draw fuel from channel 30, thereby functioning on the principle of an injector. In this manner the onrush of air through duct 16 may establish a region of low pressure in channel 30 so as to facilitate movement of the liquid fuel therethrough.

Accordingly, the present improvements provide a simple and positively operating device for accomplishing a series of essential functions. They eliminate the necessity and expense of a separate lighting device for the generator with its attendant inconvenience and difficulties in operation, they eliminate likewise the necessity of plural conduits to the generator and lighter respectively and the valves controlling same. In prior devices, a careless operator may fail to turn off the air valve after the liquid valve is full on, so that the pressure would be lost and the device cease operating. Likewise a desired mixture could be obtained only by skilled manipulation of several unrelated valves. Such disadvantages, and numerous others are overcome by the positive and unitary mechanical action of the improvements.

Various modifications within the scope of the present improvements will be apparent to those skilled in the art and may be made without departing from the purview of the invention.

We claim:

1. A fuel supply device for hydrocarbon burners comprising a tank having liquid fuel under air pressure, a fuel supply conduit communicating with said tank above and below the liquid level and a common control means for successively regulating the passage of fuel to said conduit from above and below said liquid level.

2. A fuel supply device for hydrocarbon burners comprising a tank having liquid fuel under air pressure, a fuel supply conduit, means establishing communication between said conduit and the liquid space of the tank, means establishing communication between said conduit and the air pressure region of said tank, relatively operable and independently movable control members for each of said means and a common actuating means for said members.

3. In a device of the character described the combination with a burner and a generator therefor, of means for supplying fuel thereto comprising a tank having liquid fuel under air pressure, a conduit communicating between said generator and tank, means for supplying fuel to said conduit from above and below the liquid level, and mechanical means for initially sealing off the supply of air from above the liquid level and for subsequently regulating the liquid supply.

4. In a device of the character described the combination with a vapor burner and a generator therefor, of a tank containing liquid fuel under air pressure having a space above the liquid level, a single conduit communicating said generator with said tank below the liquid level, air inlet means communicating said conduit with said air space at a point above the liquid level, valve means controlling the flow of fuel through said conduit and mechanical means for positively sealing off said air inlet in response to actuation of said valve, said valve means including mechanism for subsequently controlling the flow of liquid through said conduit.

5. A fuel supply device for hydrocarbon burners comprising a tank having liquid fuel under air pressure therein, a fuel supply conduit communicating with said tank above and below the liquid level, and means for varying the quality of fuel discharged through said conduit including relatively movable adjustable means for proportionately admitting liquid and gaseous fuel to said conduit.

6. A fuel supply device for hydrocarbon burners comprising a tank containing liquid fuel under air pressure having a space above the liquid level, a fuel supply conduit having a liquid inlet in the liquid space of the tank, said conduit also having an air inlet within the air space of the tank and relatively movable operatively connected valves for controlling said inlets, one of said valves being disposed within the tank and means outside of said tank for manipulating said valves.

7. A fuel supply device for hydrocarbon burners comprising a tank containing liquid fuel under air pressure having a space above the liquid level, a fuel supply conduit having a liquid inlet in the liquid space of the tank, said conduit also having an air inlet within the air space of the tank and means for simultaneously closing one inlet and opening the other.

8. A fuel supply device for hydrocarbon burners comprising a tank containing liquid fuel under air pressure having a space above the liquid level, a fuel supply conduit having a liquid inlet in the liquid space of the tank, said conduit also having an air inlet within the air space of the tank and means for simultaneously closing said air inlet and opening said liquid inlet.

9. A fuel supply device for hydrocarbon burners comprising a tank containing liquid fuel under air pressure having a space above the liquid level, a fuel supply conduit having a liquid inlet in the liquid space of the tank, said conduit also having an air inlet within the air space of the tank and means for simultaneously opening and closing said inlets.

10. A tank for containing liquid fuel under air pressure having a space above the liquid level, fuel outlet means for said tank comprising a duct communicating with the air space, a movable duct communicating the liquid space with said first named duct, a valve controlling said ducts, said movable duct operatively associated with said valve for responding to movements thereof and a second valve controlling said first named duct responsive to movements of said movable duct.

11. A tank for containing liquid fuel under air pressure having a space above the liquid fuel, fuel outlet means for said tank comprising a duct communicating with the air space, a movable pipe within said duct communicating with the liquid space and with said duct, a valve controlling said duct and the passage through said pipe, means maintaining said pipe in contact with said valve through a portion of the movement of the valve and a valve on said pipe positioned for controlling said duct.

12. A fuel supply device adapted to supply mixed fuel to a burner comprising a tank containing liquid fuel under air pressure having a space above the liquid level, a fuel supply conduit having portions communicating with the air and liquid spaces of the tank, said conduit portions having inlets and outlets, regulating mechanism having relatively operable members for the control of the inlets and outlets of said portions and a common member for operating said mechanism.

13. A fuel supply device for hydrocarbon burners comprising a tank containing liquid fuel under air pressure having a space above the liquid level, a fuel supply conduit having inlets within the tank communicating with said tank above and below the liquid level therein and means including a member within the tank for successively varying the quantity of fuel entering said inlets.

14. A fuel supply device for hydrocarbon burners comprising a tank having liquid fuel under air pressure, a fuel supply conduit communicating with said tank above and below the liquid level and a common control means for regulating the flow of air and liquid to said conduit mechanical means for closing off the air supply, said means including mechanism for independently controlling the flow of liquid after the flow of air is cut off.

15. In a device of the character described the combination with a burner and a generator therefor, of means for supplying fuel thereto comprising a tank having liquid fuel under air pressure, a conduit communicating between said generator and tank, means for supplying fuel to said conduit from above and below the liquid level, mechanical means for initially sealing off the supply of air from above the liquid level and for subsequently increasing the flow of liquid, and a single actuating member for said last named means.

16. In a fuel supply mechanism, a valve device comprising a valve body defining a passageway, valves controlling said passageway, a member defining another passageway through said body, one of said valves controlling said second passageway, said valves being simultaneously and relatively movable for controlling flow through said passageways, and a common member for operating said valves.

17. In a fuel control mechanism, a valve body, concentrically disposed passageways therein, separately but simultaneously movable valves for controlling said passageways at spaced points, one of said valves being also independently movable.

18. A fuel control mechanism comprising a member defining a fuel passage, separate valves controlling said passage at spaced points, a rigid member engaging said valves, spring means urging one of said valves and rigid member into mutual engagement, and an actuating member for said valves.

19. A fuel control mechanism comprising a member defining a passage, separate valves controlling each end of the passage, a member disposed between said valves for holding one valve when the other is closed, means urging one of said valves and members into mutual engagement whereby they may move as a unit, and an actuating member for moving one of said valves.

20. A fuel control mechanism comprising a valve body defining a passage, a valve controlling one end of said passage, a tubular member extending through said passage and engaging said valve, a second valve controlling the other end of said passage and being mounted for movement with said tubular member, spring means urging said second valve and tubular member toward said first valve, a control rod fixed to said first valve and disposed in said tubular member, and a manual actuating member for said first valve.

21. A starting device for a burner adapted to be used with a tank containing liquid vaporizing fuel under air pressure having in combination, a valve body having a passage therethrough, a valve seat about said passage, a valve cooperating with said seat, a second valve seat in said passage co-axial therewith, a second valve cooperating with said second seat, said valves being mounted independently of each other, means normally urging said second valve against said second seat and means carried by said second valve and engaged by said first mentioned valve to move said second valve from its seat.

22. The structure set forth in claim 21, means admitting air adjacent said second valve, air and fuel being admitted to said passage adjacent said first mentioned valve.

23. A starting device for a burner adapted to be used with a tank containing liquid vaporizing fuel under air pressure having in combination, a valve body adapted to be secured in said tank, said body having a passage therein threaded to receive the threaded portion of a valve stem, a stem threaded in said passage, a valve seat about said passage, said stem having a valve for engaging said seat, a second valve seat about said passage, a valve member for engaging said second seat, means normally urging said second valve toward said second seat, means admitting air to said passage beyond both valves so that either valve can shut off the passage of air, and means for admitting liquid through said second valve, said means being engaged by said first mentioned valve to remove said second valve from its seat, said first mentioned valve being adapted to shut off both liquid and air, said passage being adapted to be connected to said burner.

24. A starting device for a burner adapted to be used with a tank containing liquid vaporizing fuel under air pressure having in combination, a valve body secured in said tank and having a passage therethrough, a valve seat about said passage, a valve stem having an operating means thereon threaded into said body and having a valve thereon cooperating with said seat, a second valve seat about said passage below said first mentioned valve seat, a valve member cooperating with said seat, a spring urging said second valve member toward said second seat, a tube passing through said second valve and secured thereto extending above the same and being pressed against said first mentioned valve by said spring, said tube extending downward into the liquid in said tank and communicating therewith and having openings adjacent its top for the passage of liquid around said first mentioned valve when the same is lifted from its seat, said passage above said first mentioned valve being adapted to be connected to said burner.

25. A starting device for a burner adapted to be used with a tank containing liquid vaporizing fuel under air pressure having in combination, a valve body secured in said tank having a passage therethrough, a valve adapted to close the upper end of said passage, a valve seat about said passage below said valve, a second valve member adapted to cooperate with said seat to close said passage, a casing secured to the lower end of said valve body, a tube extending through said second mentioned valve upwardly through said passage and engaging said first mentioned valve, said tube having means for the passage of liquid through the sides thereof adjacent its top and extending through the bottom of said casing to adjacent the bottom of said tank, said tube having a closed lower end provided with a small aperture, a spring in said casing normally urging said second valve member and said tube upwardly, said casing having an opening therethrough communicating with the air space in said tank for admitting air to said second valve and a small rod carried by said stem extending downwardly through said tube and adapted to pass through said aperture, said first mentioned valve pressing on said tube to force said second valve from its seat when moved downwardly and permitting the closing of said second valve when moved upwardly.

26. A tank containing liquid fuel under air pressure having a space above the liquid fuel, fuel outlet means for said tank including a duct communicating with the air space, a movable pipe establishing communication between said duct and the liquid space, a valve controlling said duct and pipe, spring means maintaining said pipe in contact with said valve whereby said pipe is responsive to movements thereof, and a valve on said pipe positioned to control the air inlet to said duct.

27. A tank comprising liquid fuel under air pressure having a space above the liquid fuel, fuel outlet means for said tank including a duct communicating with the air space, a movable pipe establishing communication between said duct and the liquid space, a valve controlling said duct and pipe, a spring for maintaining said pipe in contact with said valve and another valve movable with said pipe for controlling said duct.

WALTER C. LINDEMANN.
ADOLPH T. SCHMIDT.